Patented June 18, 1935

2,005,183

UNITED STATES PATENT OFFICE 2,005,183

CATALYTIC OXIDATION OF KETONES

Walter Flemming and Walter Speer, Ludwigs-hafen-on-the-Rhine, Germany, assignors to I. G. Farbenindustrie Aktiengesellschaft, Frankfort-on-the-Main, Germany No Drawing. Application February 23, 1933, Serial No. 658,148. In Germany March 1, 1932

10 Claims. (Cl. 260—112)

The present invention relates to the catalytic oxidation of ketones.

We have found that ketones can be catalytically oxidized to carboxylic acids which are obtained in very good yields by subjecting ketones corresponding to the general formula R—CO—$R_1$, in which R denotes an alkyl, cycloalkyl, aralkyl or aryl radicle and $R_1$ an alkyl, cycloalkyl or aralkyl radicle, or in which R and $R_1$ are connected with each other as members of a non-aromatic ring system, to oxidation in the liquid phase by means of an oxygen containing gas, i. e. oxygen or a gas containing oxygen, such as air or air enriched in oxygen, for example containing 50 per cent of oxygen, in the presence of oxidation catalysts.

The reaction may be carried out at atmospheric pressure or at a pressure above atmospheric pressure, provided the formation of explosive mixtures be avoided; the partial pressure of the oxygen should, accordingly, not exceed about 5, preferably about 4 atmospheres. Thus for example, when air is employed, the reaction may be carried out at a pressure up to about 20 atmospheres, whereas a pressure up to about 5 atmospheres may be employed when oxygen is used as the oxidizing agent.

As examples of ketones which may be subjected to the oxidation according to the present invention there may be mentioned acetone, methyl ethyl ketone, methyl n-butyl ketone, methyl isopropyl ketone, di-ethyl ketone, acetyl acetone, heptanone, decanone, oleone, cyclopentanone, cyclohexanone, methyl-cyclohexanone, acetophenone, naphthacetophenone, camphor, alpha-oxo-tetrahydronaphthalene, ethyl phenyl ketone and like ketones. It will be easily understood that any ketones may be employed, except purely aromatic ketones, such as quinone, or anthraquinone.

Acetone yields acetic acid and formic acid, methyl ethyl ketone yields acetic acid, diethyl ketone yields acetic acid and propionic acid, methyl isopropyl ketone yields acetic acid and formic acid, methyl n-butyl ketone yields acetic acid and butyric acid and also formic acid and valeric acid, cyclopentanone yields glutaric acid, naphthacetophenone yields naphthoic acid and formic acid, cyclohexanone yields adipic acid, methylcyclohexanone yields methyl adipic acid, camphor yields camphoric acid and acetophenone a mixture of benzoic and formic acids.

The oxidation catalysts which may be employed for carrying out the present invention comprise solid, polyvalent metals having an atomic weight between about 50 and about 200, such as for example vanadium, chromium, manganese, iron, cobalt, nickel, copper, molybdenum, the rare earths such as cerium, praseodymium, neodymium, lanthanum, samarium and the terbium earths, tungsten, platinum, iridium and osmium and gold. These metals may be added to the reaction mixture in the metallic, finely divided state, preferably in the form of powders, or also in the form of their oxides, carbonates, chlorides, sulphates, or carboxylates such as formates, acetates, propionates, stearates, oleates, tartrates or also in the form of their enolates, such as acetyl acetonates. Among these catalysts manganese and cobalt are especially useful, preferably in the form of their formates, acetates or acetyl-acetonates. Mixtures of several of these catalysts may also be employed, for a example a mixture of cobalt and manganese in the form of their acetates and/or acetylacetonates.

Very small amounts of the aforesaid oxidation catalysts are sufficient for carrying out the reaction. Thus, for example, about 0.01 per cent, by weight of the ketone, of the catalyst is already sufficient for a marked oxidation; usually, the catalysts are, however, used in an amount of from about 0.1 to about 1 per cent by weight of the ketone, quantities such as 2, 3, 5 or 10 per cent, or even more, being, however, also used if so desired.

As stated above, the oxidation is carried out in the liquid phase. This means that the ketones are oxidized in the liquid or dissolved state. Solvents which may be employed for dissolving the ketones are for example carboxylic acids containing from 1 to 3 carbon atoms, such as formic acid, acetic acid and propionic acid, and methyl or ethyl esters of these acids. Halogenated hydrocarbons such as carbon tetrachloride or chloro-benzene may also be employed as the solvent. All these solvents are practically inert to the oxidation and capable of dissolving the initial ketones. Glacial acetic acid is, however, the preferred solvent employed. The use of acetic or formic acid is especially advantageous when the catalyst is employed in the metallic state because the metal is then readily dissolved. In order to start the reaction it is preferable to add a small amount, such as 1 per cent by weight of the ketone, of acetic acid or another of the aforesaid acids, also when the reaction is carried out in the absence of solvents.

The reaction is generally carried out at temperatures between about 50° and about 120° C., preferably between about 75 and 105° C. It is usually carried out by heating the reaction mixture to the aforesaid temperatures in order to start the reaction; after some time heating is no more necessary since the heat evolved keeps the mixture at the reaction temperature. Sometimes even cooling may become necessary in order to avoid too complete oxidation.

The oxidation may be effected for example by blowing oxygen, or gaseous mixtures containing oxygen, such as air, into the liquid or dissolved ketone heated to about the boiling temperature of the ketone or of the solvent (80° C. of methyl ethyl ketone and 56° C. of acetone at atmospheric pressure) to which ketone or solution thereof an oxidation catalyst has been added and which is situated in a vertical long cylindrical vessel provided with a reflux condenser. It is advantageous to disperse the oxidizing gas as finely as possible, as for example by employing finely porous glass filter plates (fritted glass particles) and filler bodies, such as shavings or, especially, bodies of the kind known as Raschig rings. The reaction vessel is made from materials resistant to the components of the reaction and, if necessary, tight to pressure. Such materials are for example ceramic masses, glass or metal alloys such as chrome-nickel steels, or nickel alloys free from iron. Similarly, the filler bodies may be made from the same resisting materials. It is advantageous to add a small amount of an acid, preferably acetic acid, to the ketone at the start, since in this case the reaction commences immediately.

When carrying out the reaction with ketones having a boiling point below the reaction temperature working under increased pressure is necessary in order to keep the ketone in the liquid state. It is, however, also possible in this case to dissolve the ketone in a solvent having a higher boiling point, such as glacial acetic acid, in which case the reaction may also be carried out at atmospheric pressure, the use of an increased pressure being, however, also possible.

The process proceeds in a particularly advantageous manner when acetic acid together with the catalyst are first introduced into the oxidation vessel, the ketone to be oxidized being introduced gradually into the acetic acid solution or other dispersion while simultaneously leading in oxygen or air. Working in the last-mentioned manner has the advantage that the process may be carried out at temperatures up to the boiling point of the acid employed for dispersing the catalyst without the employment of increased pressure. At the same time the yield is especially favourable. When working with ketones having a molecular weight above that of acetone and methyl ethyl ketone, it is preferable to introduce the ketone, the solvent if such be employed, and the catalyst into the vessel and to carry out the oxidation as at batch process.

The waste gas formed during the oxidation contains but a little carbon dioxide and a little aldehyde, such as acetaldehyde which is formed as an intermediate product in the reaction; the gas may be used for further oxidations, if desired, after washing out the aldehyde and the carbon dioxide, for example with the aid of an aqueous solution of a caustic alkali, i. e. caustic soda or caustic potash, if desired after separating the aldehyde by cooling.

The great importance of the process for the oxidation of methyl ethyl ketone and acetone to acetic acid according to the present invention resides in the fact that the methyl ethyl ketone and acetone are obtainable from butane or ethane or from an intermediate stage of their conversion into methyl ethyl ketone, such as butylene or secondary butyl alcohol, or as regards acetone, from propane, propylene or isopropyl alcohol. Propane, butane, ethane, propylene, butylene and ethylene are, however, by-products from the conversion of coals, tars, and mineral oils into valuable fuels and are therefore available in large amounts. The process according to this invention thus offers the possibility of a specially favourable employment of these volatile hydrocarbons. For example butane may be converted into methyl ethyl ketone in the following manner: dehydrogenation of the butane to form butylene, hydration of the butylene to form secondary butyl alcohol, and dehydrogenation or oxidation of the secondary butyl alcohol to form methyl ethyl ketone. When starting from ethylene, which may be readily obtained by dehydrogenation of ethane or by splitting carbon compounds of high molecular weight or which is present in large amounts in cracking gases, the ethylene is converted by condensation, preferably according to the application Ser. No. 387,794, filed August 22nd, 1929, into butylene which may then be worked up into methyl ethyl ketone as already described.

Insofar as ketones having a molecular weight above that of acetone and methyl ethyl ketone are concerned, the reaction is of great importance for the working up of unsaturated hydrocarbons recovered as by-products in the conversion into fuels of distillable hydrocarbon materials such as the different kinds of coal, peat, tar and mineral oils. These unsaturated hydrocarbons of a comparatively high molecular weight, mainly olefines, may be converted in known manner into ketones which can be further converted into most valuable carboxylic acids according to the process of the present invention.

The following examples will further illustrate the nature of this invention but the invention is not restricted to these examples. The parts are by weight if not otherwise stated.

*Example 1*

Butylene obtained from butane or ethylene is converted in any suitable known manner first into secondary butyl alcohol and then into methyl ethyl ketone. The oxidation of the ketone is carried out in a vertically arranged long cylindrical vessel of chromium nickel steel, which is provided at the top with a reflux condenser and into the bottom of which oxygen or air enters in a finely divided state through a porous glass filter, as follows:—

100 parts of glacial acetic acid in which 5 parts of manganese acetate are dissolved are introduced into 2000 parts of the ketone. The reaction mixture is heated to from 80° to 100° C. and a current of oxygen of 200 litres per hour and per about 2 kilograms of the mixture is led through the mixture for 15 hours. The oxygen is absorbed during the first few hours very strongly and later more slowly. After the said time 80 per cent of the theoretical amount of the ketone employed is converted into acetic acid. After distilling off the small amounts of ketone still contained therein, acetic acid is obtained in a highly concentrated form. The waste gas consists mainly of oxygen which may be led into a second oxidation vessel or back into circulation either directly or after removal of small amounts of carbon dioxide.

The oxidation may also be carried out in the absence of acetic acid from the start. In this case the oxidation is very slow for the first 10 or 20 hours, after which, however, it proceeds very rapidly.

*Example 2*

1500 parts of acetic acid in which 2.5 parts of manganese acetate and 2.5 parts of copper acetate have been dissolved are introduced into the vessel described in Example 1 and the vessel is heated to an internal temperature of from 100° to 103° C. A current of oxygen of 200 litres per hour and per 1.5 kilograms of the mixture, which first flows through a vessel heated to from 50° to 75° C. and containing 2000 parts of methyl ethyl ketone, is then led into the vessel. The vapours of the ketone carried along with the current of oxygen are immediately oxidized in the oxidation vessel. The waste gas contains only very small amounts of carbon dioxide and may be led directly into a second oxidation vessel. After 6 hours the methyl ethyl ketone contained in the receiver has all been evaporated and after another hour the oxidation is completed. A total yield of from 90 to 95 per cent (calculated on the ketone employed) of the theoretical yield of highly concentrated acetic acid is obtained.

*Example 3*

Propane is converted in a known manner first into propylene and isopropyl alcohol and then into acetone. The oxidation of the acetone is carried out in a vertically arranged cylindrical vessel of chromium-nickel steel, the length of which is about 20 times its internal diameter, provided at its top with a reflux condenser and into which finely divided oxygen or air is introduced from below through a porous glass filter (fritted glass particles) in the following manner:—

1500 parts of concentrated acetic acid, wherein 5 parts of manganese acetate are dissolved, are introduced into the oxidation vessel, which is then heated to 90° C. A current of oxygen, with a velocity of 100 litres per hour and per about 1.5 kilograms of the concentrated acetic acid, is passed through a vessel containing acetone and heated to from 40° to 50° C. and then introduced into acetic acid. The vapours of ketone carried along with the current of oxygen are dissolved in the acetic acid in the oxidation vessel and immediately oxidized, whereby in the inner part of the reaction vessel considerable heat is evolved. If the vessel be heated by means of a water-bath, its temperature should be kept at the most between 78° and 84° C. after the commencement of the reaction. The waste gases contain only very small amounts of carbon dioxide. After about 8 hours the acetone has disappeared, and the oxidation is rendered complete after a further 4 hours. From 90 to 95 per cent of the theoretical yield (calculated on the ketone employed) of highly concentrated acetic acid and formic acid in the ratio of about 13.5 to about 9.5 parts by weight are obtained.

*Example 4*

2000 parts of acetone and 200 parts of glacial acetic acid together with 4 parts of cobalt acetylacetonate and 1 part of manganese acetylacetonate are introduced into an acid-proof pressure-tight reaction vessel provided at its top with a condenser. The mixture is then heated to 75° C. and a current of air of 300 litres per hour and per about 2.2 kilograms of the mixture is then led through the latter. The gas pressure in the reaction vessel is maintained at from 3 to 4 atmospheres by means of a valve arranged at the upper end of the condenser. The acetone is gradually oxidized, the oxidation being finished after from 12 to 14 hours. The waste gas contains only small amounts of carbon dioxide. The vapours carried along with the waste gas are removed by strong cooling of the latter. A total yield, including the quantities recovered from the waste gas, of from 90 to 95 per cent of the theoretical yield of acetic acid and formic acid is obtained.

*Example 5*

A mixture of 100 grams of diethyl ketone, 50 grams of glacial acetic acid and 0.2 gram of manganese acetate is introduced into a cylindrical vessel of chrome-nickel steel having an inner diameter of 5.5 centimeters and a height of 35 centimeters and the bottom of which is provided with a porous glass filter. The vessel is heated to 100° C., a current of oxygen being then led through the filter during 10 hours at the rate of 10 litres per hour. A mixture of acids is thus obtained, consisting of 104 grams of acetic acid and 48 grams of propionic acid.

*Example 6*

A mixture of 100 grams of methyl isopropyl ketone with 75 grams of glacial acetic acid and 0.2 gram of manganese acetate is oxidized in the manner described in Example 5. A mixture of 196 grams of acetic acid and of 42 grams of formic acid is thus obtained.

*Example 7*

A mixture of 98 grams of cyclohexanone with 100 grams of glacial acetic acid and 0.1 gram of manganese acetate is introduced into the vessel described in Example 5. After heating the vessel to about 100° C. a current of air is introduced through the glass filter at the rate of 25 litres per hour. After 5 hours the oxidation is interrupted and the unaltered cyclohexanone is distilled off together with the acetic acid, the distillate being then subjected anew to oxidation. Adipic acid is thus obtained in a yield corresponding to 80 per cent of the cyclohexanone employed.

*Example 8*

A solution of 112 grams of methyl cyclohexanone in 100 grams of glacial acetic acid is oxidized in the manner described in Example 7, after the addition of 0.1 gram of manganese acetate, the reaction temperature being, however, 80° C. The yield in methyl adipic acid is 74 per cent, calculated on the methyl cyclohexanone employed.

*Example 9*

A mixture of 50 grams of acetophenone with 100 grams of glacial acetic acid and 0.2 gram of manganese acetate is treated at 105° C. during 12 hours by a current of 5 litres of oxygen per hour. 25 grams of benzoic acid and 7 grams of formic acid are thus obtained. The unaltered acetophenone may be anew oxidized in the aforesaid manner.

What we claim is:—

1. The process for the catalytic oxidation of ketones, which comprises subjecting a ketone corresponding to the general formula R—CO—R$_1$, in which R denotes an alkyl, cycloalkyl, aralkyl or aryl radicle and R$_1$ and alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst.

2. The process for the catalytic oxidation of ketones, which comprises subjecting a ketone corresponding to the general formula R—CO—R$_1$, in which R denotes an alkyl, cycloalkyl, aralkyl or aryl radicle and R$_1$ an alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst at from about 50 to about 120° C.

3. The process for the catalytic oxidation of ketones, which comprises subjecting a ketone corresponding to the general formula R—CO—R$_1$, in which R denotes an alkyl, cycloalkyl, aralkyl or aryl radicle and R$_1$ an alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst and of a solvent inert to oxidation.

4. The process for the catalytic oxidation of ketones, which comprises subjecting a ketone corresponding to the general formula R—CO—R$_1$, in which R denotes an alkyl, cycloalkyl, aralkyl or aryl radicle and R$_1$ an alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst, the partial pressure of oxygen being at the most about 5 atmospheres.

5. The process for the catalytic oxidation of ketones, which comprises subjecting a ketone corresponding to the general formula R—CO—R$_1$, in which R denotes an alkyl, cycloalkyl, aralkyl or aryl radicle and R$_1$ an alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst and of a solvent inert to oxidation at from about 50 to about 120° C., the partial pressure of oxygen being at the most about 5 atmospheres.

6. The process for the catalytic oxidation of ketones, which comprises subjecting a ketone corresponding to the general formula R—CO—R$_1$, in which R denotes an alkyl, cycloalkyl, aralkyl or aryl radicle and R$_1$ an alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst comprising a solid polyvalent metal, having an atomic weight between about 50 and about 200.

7. The process for the catalytic oxidation of ketones, which comprises subjecting a ketone corresponding to the general formula R—CO—R$_1$, in which R denotes an alkyl, cycloalkyl, aralkyl or aryl radicle and R$_1$ an alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst comprising a solid, polyvalent metal having an atomic weight between about 50 and about 200 and of a solvent inert to oxidation at from about 50° to about 120° C.

8. The process for the catalytic oxidation of ketones, which comprises subjecting a ketone corresponding to the general formula R—CO—R$_1$, in which R denotes an alkyl, cycloalkyl, aralkyl or aryl radicle and R$_1$ an alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst comprising a solid, polyvalent metal having an atomic weight between about 50 and about 200 and of a solvent selected from the group consisting of formic, acetic and propionic acids and methyl and ethyl esters of these acids, at from about 50 to about 120° C., the partial pressure of oxygen being at the most about 5 atmospheres.

9. The process for the catalytic oxidation of ketones, which comprises subjecting a ketone corresponding to the general formula R—CO—R$_1$, in which R denotes an alkyl, cycloalkyl, aralkyl or aryl radicle and R$_1$ and alkyl, cycloalkyl or aralkyl radicle or in which R and R$_1$ are connected with each other as members of a non-aromatic ring system, to oxidation, in the liquid phase, by means of a gas containing oxygen, in the presence of an oxidation catalyst comprising at least one metal selected from the group consisting of manganese and cobalt, and of acetic acid, at from about 50° to about 120° C., the partial pressure of oxygen being at the most about 5 atmospheres.

10. The process for the catalytic oxidation of ketones, which comprises subjecting acetone to oxidation, in the liquid phase, by means of a gas containing oxygen, in the presence of an oxidation catalyst comprising at least one metal selected from the group consisting of manganese and cobalt, and of acetic acid, at a temperature between about 75° and about 105° C., the partial pressure of oxygen being at the most about 5 atmospheres.

WALTER FLEMMING.
WALTER SPEER.